United States Patent [19]

Pallini, Jr. et al.

[11] Patent Number: 4,846,508

[45] Date of Patent: Jul. 11, 1989

[54] TUBULAR CONNECTOR SYSTEM

[75] Inventors: Joseph W. Pallini, Jr.; Lionel J. Milberger; B. Lee Danner, all of Houston, Tex.

[73] Assignee: Vetco Gray Inc., Houston, Tex.

[21] Appl. No.: 133,682

[22] Filed: Dec. 16, 1987

[51] Int. Cl.$^4$ .............................................. F16L 55/00
[52] U.S. Cl. ..................... 285/175; 285/334; 285/92; 29/525.1; 403/307; 403/343
[58] Field of Search ............... 285/334, 333, 175, 369, 285/81, 92; 403/307, 343; 29/526 R, 453, 525

[56] References Cited

U.S. PATENT DOCUMENTS

| | | | |
|---|---|---|---|
| 176,796 | 5/1876 | Martin | 285/32 |
| 731,635 | 2/1903 | Vandegrift et al. | 403/46 |
| 1,326,970 | 1/1920 | Row et al. | 285/89 |
| 1,781,091 | 7/1924 | Wilson | 285/175 |
| 2,122,757 | 7/1938 | Scott | 285/175 X |
| 2,535,694 | 12/1950 | Payne | 285/918 X |
| 2,906,152 | 8/1958 | Brase | 285/175 X |
| 4,397,484 | 8/1983 | Miller | 285/81 |
| 4,487,433 | 12/1984 | Miller | 285/81 |
| 4,568,113 | 2/1986 | Axford et al. | 285/334 |
| 4,717,183 | 1/1988 | Nobileau | 285/334 |

Primary Examiner—Dave W. Arola
Assistant Examiner—Paul M. Frechette
Attorney, Agent, or Firm—James E. Bradley

[57] ABSTRACT

A tubular connector system is disclosed for joining two pipe ends without the necessity of rotating the pipe ends. One pipe end is provided with an external thread and a second pipe end includes multiple thread lead entries. The tubular connector includes an internal thread at one end and internal multiple thread lead entries at the other end. The tubular connector is first threaded onto the first pipe. Next, the second pipe is stabbed into the second end of the tubular connector and the tubular connector is then rotated less than a single turn with respect to the second pipe to fully mate the tubular connector and the second pipe. In a preferred embodiment of the present invention the tubular connector is provided with resilient seals and a slot and tab arrangement to restrict rotation after make-up.

9 Claims, 1 Drawing Sheet

TUBULAR CONNECTOR SYSTEM

BACKGROUND OF THE INVENTION

1. Field of the Invention: This invention relates in general to methods and apparatus for joining pipe ends and in particular to methods and apparatus for joining large diameter pipe ends without the necessity of rotating the pipe.

2. Description of the Prior Art: In the early 1960's oil exploration and production went offshore, and the limitations of the technical possibilities of standard A.P.I. threaded or flanged connections became apparent because of the increase in diameter of the connection required in offshore operation, the requirement of being able to make-up and disconnect underwater connections remotely, and the motions of the floating support where most of the offshore operations were taking place. Also the cost of field welding widely used onshore to connect sections of large pipe, became prohibitive due to the high hourly cost of offshore operations. In those early days, three types of connectors were introduced to solve these problems.

First, a specialized generation of thread connectors were designed, using modified A.P.I. conical thread, to extend the use of threaded casing connections larger than sixteen inches for operation from a floating support. These threaded connectors are still widely used today, for dimensions below twenty-four inches, despite the requirement of a minimum of two and one-half turns of rotation for make-up.

This rotation is commonly achieved either by use of a hydraulic power tong which requires a specialized crew to operate, or the conventional "rope technique" consisting of pulling on a soft rope from the drilling rig main winch capstan. The rope is rigged three to five turns around the add-on casing piece body, and the pull rotates the pin and box members toward each other. Final make-up torque is reached by the use of a mechanical tong consisting of a large chain wrench having a lever extending radially to multiply the torque generator by the cathead chain hooked onto the end of the lever. The other end of the cathead chain is pulled by a drilling rig main winch.

The maximum amount of rotation achieved in one stroke of such a mechanical tong/cathead chain assembly is approximately one-quarter to one-third of a turn without the necessity of having to reset the assembly by manual reverse rotation.

A threadless second connector for large diameter casings was also introduced based upon snap-ring linkage. These "snap-ring" type connectors offer fast make-up but offer neither the low weight-to-capacity ratio, nor the rigidity or price competitiveness of the threaded connector for a given capacity.

A third connector, featuring radial dogs, was introduced to replace flange connections, in a mechanical configuration for drilling riser connections, and in a hydraulic configuration for wellhead connections.

Recently, the use of dog type connectors has been extended to offshore platform anchoring pile connections, but its success has been limited by its high cost, due to the large number of parts and heavy section required in the design and manufacture of such a connector.

In the 1970's, two additional types of connectors were introduced. One type of connector featured large dimensioned threads or circular grooves which are cylindrical or conical. Such threads or grooves are milled out on at least two sections limited by cylindrical or conical generatrix, in order that make-up of the connector can be achieved by axial stabbing, followed by a rotation of a fraction of a turn to bring the remaining portions of threads or grooves into an interlocking configuration. The make-up rotation is limited to a maximum of one-quarter of a turn.

The major drawback experienced with this type of connector, despite its fast make-up characteristics, is the cost of manufacturing, due to the extensive milling operation and the capacity-to-weight ratio, due to the removal of fifty percent of the loading surfaces.

A second type of connector introduced during this period is a no rotation "interference type" connector mainly designed for permanent application such as an offshore platform conductor pipe or anchoring pile. It presents the major drawbacks of not being disconnectable and requiring a special bulky hydraulic clamping unit, operated by a specialized crew, for make-up.

Recently a method and apparatus for making tubular connections was disclosed in U.S. Pat. No. 4,717,183, and assigned to the assignee herein, which utilizes multiple start threads to provide a relatively strong and rapid make-up between two pipe members. While this technique does represent an advance in the art, it still requires rotation of the pipe members to make the joint. The large diameter of pipes being utilized in the modern offshore drilling and production make it desirable to implement a system which permits the making of a joint without the necessity of pipe rotation, such as the connections for large diameter tendons on tension leg platforms.

SUMMARY OF THE INVENTION

It is therefore one object of the present invention to provide an improved tubular connector system.

It is another object of the present invention to provide an improved tubular connector system which permits a pipe joint to be assembled without the necessity of rotating either section of pipe.

It is yet another object of the present invention to provide an improved tubular connector system which permits rapid and simple make-up connection with a minimum of rotation of a tubular connector, which has a short length.

The foregoing objects are achieved as is now described. The tubular connector system of the present invention includes one pipe end with an external thread and a second pipe end which includes multiple thread lead entries. A tubular connector is provided which includes an internal thread at one end and internal multiple thread lead entries at the other end. The tubular connector is first threaded onto the first pipe. Next, the second pipe is stabbed into the tubular connector and the tubular connector is then rotated less than a single turn with respect to the second pipe to fully mate the tubular connector and the second pipe. In a preferred embodiment of the present invention the tubular connector is provided with resilient seals and a slot and tab arrangement to restrict unscrewing or break-out rotation after make-up.

The above as well as additional objects, features, and advantages of the invention will become apparent in the following detailed description.

BRIEF DESCRIPTION OF THE DRAWING

The novel features believed characteristic of the invention are set forth in the appended claims. The invention itself; however, as well as a preferred mode, of use, further objects and advantages thereof, will best be understood by reference to the following detailed description of an illustrative embodiment when read in conjunction with the accompanying drawings, wherein:

FIG. 1 is a partial sectional view of the tubular connector system of the present invention after stab-in of the upper pipe;

FIG. 2 is a view in elevation of the upper pipe of FIG. 1, before stab-in; and

FIG. 3 is a partial sectional view of the tubular connector system of the present invention of the present invention after make-up.

DETAILED DESCRIPTION OF THE INVENTION

Figures 1, 2, 3:
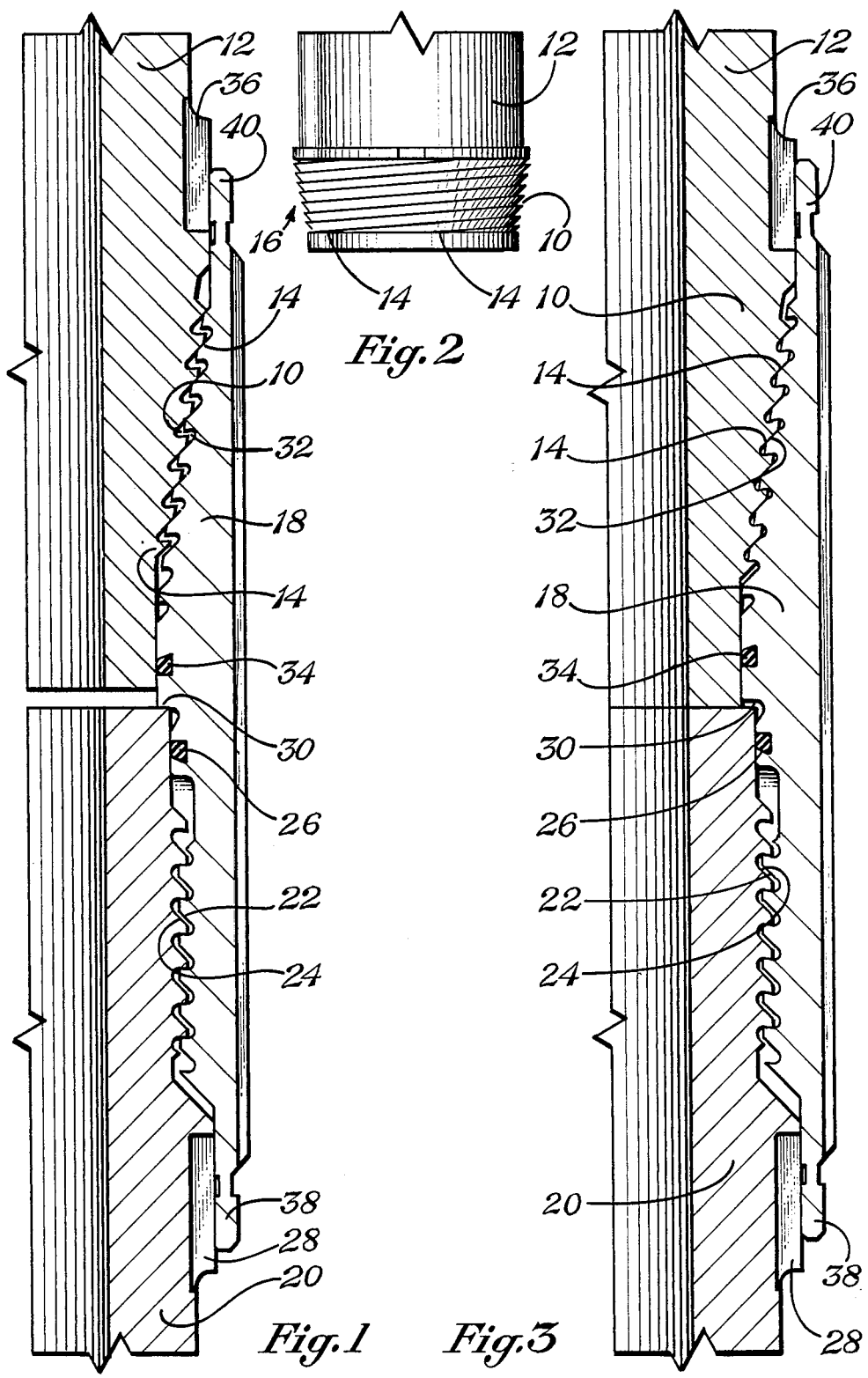

With reference now to the figures and in particular with reference to FIGS. 1 and 2 there is depicted respectively a partial sectional view of the tubular connector system of the present invention, after stab-in, and a view in elevation of pin member 10 of upper pipe 12. As can be seen, pin member 10 of upper pipe 12 includes a plurality of right hand thread lead entries 14 disposed on a frusto-conical surface 16. In the preferred embodiment of the present invention, pin member 10 includes at least three thread lead entries 14 and preferably four thread lead entries 14. As those skilled in the art will appreciate, by utilizing multiple thread starts or lead entries on pin member 10, it will be possible, after stabbing pin member 10 into tubular connector 18, to fully mate pin member 10 and tubular connector 18 with less than one full rotation of either pin member 10 or tubular connector 18.

Referring more particularly to FIG. 1, it may be seen that tubular connector 18 has been threaded onto a lower pipe 20 by mating single lead right hand internal threads 22, of tubular connector 18, with external threads 24 of lower pipe 20 until lower pipe 20 abuts against internal shoulder 30 of tubular connector 18. Preferably this is accomplished by rotation of tubular connector 18 with respect to lower pipe 20, thus permitting this connection to be made without rotation of lower pipe 20. In the depicted embodiment of the present invention, a resilient seal member 26 is utilized to provide sealing action between tubular connector 18 and lower pipe 20. Rotation between lower pipe 20 and tubular connector 18 may be restricted after make-up by utilization of a plurality of slots 28 which have been milled in lower pipe 20 and tab 38 of tubular connector 18 which may be manually deformed into one of the slots 28 after make-up.

Resilient seal member 26 may be implemented by utilizing an o-ring mounted within tubular connector 18 in the manner depicted in FIG. 1. Also depicted in FIG. 1 is the position of upper pipe 12 and pin member 10 after stab-in to tubular connector 18. As can be seen, multiple thread entries 14 partially mate with internal multiple start threads 32 of tubular connector 18. As above, resilient sealing member 34 may be utilized to provide a resilient seal between upper pipe 12 and tubular connector 18 and rotation between upper pipe 12 and tubular connector 18 may be restricted by the utilization of slots 36 and tab 40.

With reference now FIG. 3, there is depicted a partial sectional view of the tubular connector system of the present invention after make-up. As can be seen, tubular connector 18 has been rotated, causing multiple thread lead entries 14 to fully mate with internal multiple start threads 32 of tubular connector 18. As those skilled in the thread art will appreciate, by utilizing multiple start threads it is possible to fully mate tubular connector 18 and pin member 10 by rotating tubular connector 18 less than one full turn with respect to pin member 10. When utilizing four thread lead entries it is possible to fully mate pin member 10 and tubular connector 18 with 5/16th of one rotation.

As is depicted, the rotation of tubular connector 18 with respect to lower pipe 20 has caused lower pipe 20 to unseat itself from internal shoulder 30; however, the majority of external threads 24 remain fully engaged with internal threads 22, ensuring the rigid and complete mating of upper pipe 12 and lower pipe 20. Those skilled in this art will appreciate that the present invention may also be practiced by utilizing pipe sections with opposite thread rotation. In such an application it will be necessary to fully mate lower pipe 20 with tubular connector 18 and then back tubular connector 18 off of lower pipe 20 5/16th of one turn. Thereafter, upper pipe 12 will be stabbed-in and mated by 5/16ths of a rotation of tubular connector 18, fully mating multiple thread lead entries 14 of pin member 10 with the multiple start threads 32 of tubular connector 18 while simultaneously tightening tubular connector 18 onto lower pipe 20.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A tubular connector system for joining two pipe ends comprising:

a first pipe having an externally threaded end with right hand threads;

a second pipe having an externally threaded end with a plurality of right hand thread lead entries;

a tubular connector including a first end having internal threads matching said external threads on said first pipe and a second end having a plurality of internal thread lead entries, the internal thread lead entries being configured to cause the second pipe to make up in the tubular connector with substantially less rotation than the rotation required to make up the first pipe in the tubular connector, wherein said first pipe and said tubular connector may be initially fully mated by relative rotation and wherein said second pipe and said tubular connector may then be fully mated by less than a single rotation of said tubular connector with respect to said first pipe and said second pipe, causing said first pipe to unscrew a selected amount from said tubular connector, said ends of said pipes abutting when said second pipe has fully mated with said tubular connector.

2. The tubular connector system according to claim 1 wherein said second pipe includes at least three thread lead entries.

3. The tubular connector system according to claim 1 wherein said tubular connector has a shoulder which is contacted by said first pipe when said first pipe is fully made up, and wherein said first pipe separates from said shoulder when said tubular connector is fully made up to said second pipe.

4. The tubular connector system according to claim 1 wherein said tubular connector also includes resilient seal means for sealing between said tubular connector and said first pipe and said second pipe.

5. The tubular connector system according to claim 4 said tubular connector has a shoulder formed internally within said tubular connector which is contacted by said end of said first pipe when said first pipe is fully made up, and wherein said end of said first pipe separates from said shoulder when said tubular connector is fully made up to said second pipe.

6. A tubular connector system for joining two pipe ends comprising:
  a first pipe having an externally threaded end comprising a single helical right hand thread;
  a second pipe having an externally threaded end with a plurality of right hand thread lead entries disposed on a frusto-conical surface; and
  a tubular connector including a first end having internal threads matching said single helical right hand thread and a second end having a plurality of internal right hand thread lead entries, said tubular connector having a shoulder located for contact by said first pipe when said tubular connector is tightened fully onto said first pipe, said second end of said tubular connector being free of obstructions so as to allow the end of said second pipe to abut the end of said first pipe when said pipes are fully made up, wherein said first pipe and said tubular connector may be initially made up by relative rotation, and wherein said second pipe and said tubular connector may then be fully made up by less than a single rotation of said tubular connector with respect to said first pipe and said second pipe, causing said first pipe to back off from the shoulder, and the end of the second pipe to abut the end of the first pipe.

7. The tubular connector system according to claim 6 wherein said second pipe includes four thread lead entries.

8. The tubular connector system according to claim 6 wherein said tubular connector also includes resilient seal means for sealing between said tubular connector and said first pipe and said second pipe.

9. A method of joining two pipe ends without rotating said pipe ends comprising the steps of:
  providing a first pipe having an externally threaded end;
  providing a second pipe having an externally threaded end with a plurality of thread entries which extend in the same rotational direction as said threaded end of said first pipe;
  providing a tubular connector including a first end having internal threads matching said external threads on said first pipe and a second end having a plurality of internal thread lead entries;
  threading said first end of said tubular connector onto said first pipe until said threaded end of said first pipe is fully made up in said first end of said tubular connector; then
  stabbing said second pipe into said second end of said tubular connector; and
  rotating said tubular connector relative to said first and second pipes less than a full turn with respect to said second pipe, causing said first pipe to unscrew slightly from said tubular connector and causing said second pipe to screw fully into said tubular connector with said end of said second pipe abutting said end of said first pipe.

* * * * *